United States Patent
Luong et al.

[11] Patent Number: 5,855,797
[45] Date of Patent: Jan. 5, 1999

[54] REMEDIATION OF SOIL CONTAMINATED WITH ORGANIC COMPOUNDS

[76] Inventors: Huan V. Luong, P. O. Box 81601; Hsing Kuang Lin, 2143 Bridgewater Dr., both of Fairbanks, Ak. 99709-4104

[21] Appl. No.: 918,095

[22] Filed: Aug. 25, 1997

Related U.S. Application Data

[63] Continuation-in-part of Ser. No. 788,520, Jan. 24, 1997, abandoned.

[51] Int. Cl.$^6$ ........................................... C02F 1/72
[52] U.S. Cl. .................... 210/747; 210/758; 210/759; 210/909
[58] Field of Search .................... 210/747, 758, 210/759, 909

[56] References Cited

U.S. PATENT DOCUMENTS

| | | | |
|---|---|---|---|
| 4,861,484 | 8/1989 | Litchin et al. | 210/638 |
| 5,269,943 | 12/1993 | Wickramanayake | 210/747 |
| 5,286,141 | 2/1994 | Vigneri | 405/128 |
| 5,302,287 | 4/1994 | Losack | 210/747 |
| 5,425,881 | 6/1995 | Szejtli et al. | 210/747 |
| 5,552,059 | 9/1996 | Chow | 210/747 |
| 5,667,690 | 9/1997 | Doddema et al. | 210/747 |

FOREIGN PATENT DOCUMENTS

| | | | |
|---|---|---|---|
| 646440 | 8/1962 | Canada | 210/759 |
| 2945 | 1/1978 | Japan | 210/759 |

*Primary Examiner*—Christopher Upton
*Attorney, Agent, or Firm*—R. Russel Austin

[57] ABSTRACT

A method of remediating water or soil contaminated with contaminants including one or more halogenated, phenyl related biphenyl related, triazine related, and petroleum related compounds includes reacting the contaminated water or soil with an oxidant, and one or more metals in elemental or alloy form until essentially all of the contaminants has been decomposed and the water or soil is essentially free of the contaminants.

7 Claims, 1 Drawing Sheet

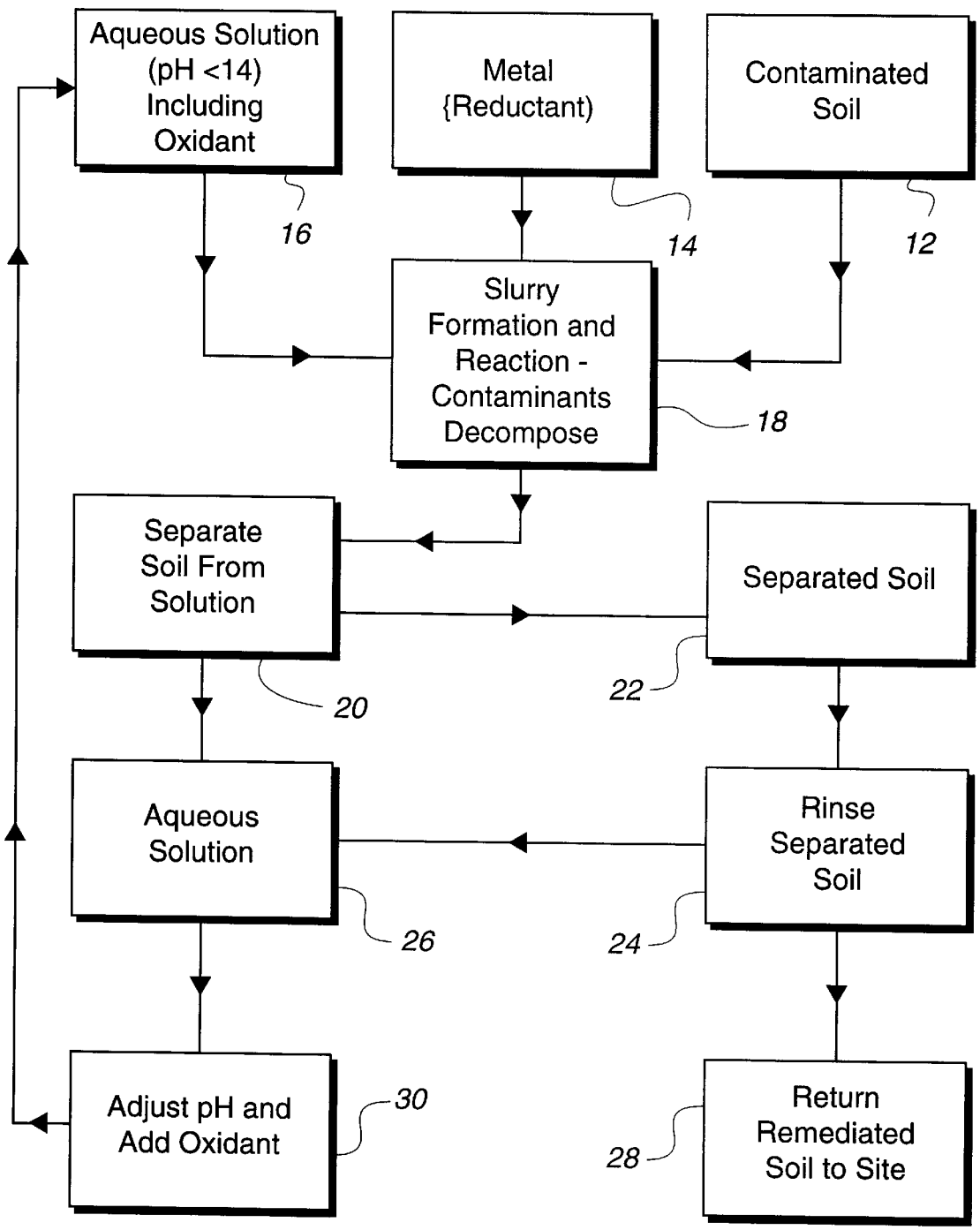

5,855,797

REMEDIATION OF SOIL CONTAMINATED WITH ORGANIC COMPOUNDS

CROSS REFERENCE TO PRIOR APPLICATIONS

This application is a Continuation-in-Part of application Ser. No. 08/788,520 filed Jan. 24, 1997, now abandoned.

TECHNICAL FIELD OF THE INVENTION

The present invention relates in general to methods of removing organic compounds from soil contaminated therewith. The present invention relates in particular to a method for removing phenol related hydrocarbon compounds such as pentachlorophenol (PCP) and polychlorinated biphenyls (PCB) from soil contaminated therewith.

DISCUSSION OF BACKGROUND ART

There are many areas in the United States and in other countries of the world where soil or water is contaminated with one or more phenol related compounds. Phenol related compounds are compounds in which the hydrogens of phenol are replaced by other atoms or compounds. Well known examples are pentachlorophenol meta-chlorophenol and polychlorinated biphenyls. These compounds are toxic to humans to some degree and have been shown to cause cancer in animals. One effective method of remediation for contaminated soils, approved by the United States Environmental Protection Agency, is based on high temperature incineration. High temperature incineration, however, requires high energy consumption and is as costly as a result. Further, as incineration facilities are in fixed locations, soil to be remediated may need to be transported from a contaminated site to an incineration facility, and returned to the site, further increasing remediation cost.

There is a need for a soil remediation method which is not energy intensive, and which can be carried out on or close to a contaminated site.

SUMMARY OF THE INVENTION

The present invention is directed to a method for removing contaminant material including at least one of pentachlorophenol (PCP) or polychlorinated biphenyls (PCBs) from soil contaminated therewith.

In one aspect of the present invention the method comprises the steps mixing the contaminated soil, a metal in metallic form, and a first, aqueous solution including an oxidant, to form a first slurry. The first slurry is periodically agitated until essentially all of the contaminant material in the soil has been decomposed, thereby forming a second slurry. The second slurry includes soil which is essentially free of the contaminant material, and a second aqueous solution. Once essentially all of the contaminant in the slurry has been decomposed, the soil is essentially contaminant-free and may be separated from the slurry, for example, by settling or filtration.

In another aspect of the present invention, the pH of aqueous solution remaining after soil separation may be adjusted, by addition of acid or base, to the pH value of the original aqueous solution and the pH-adjusted, aqueous solution may be used in further soil remediation cycles.

A preferred oxidant is hydrogen peroxide ($H_2O_2$). A preferred metal is a metal including at least one element selected from the group consisting of iron (Fe), aluminum (Al), manganese (Mn), and magnesium (Mg). Reaction of the contaminant-containing medium with oxidant and metal may be carried out at a temperature between one and eighty degrees Centigrade (°C.). Preferably, the metal is present in a molar ratio with the oxidant greater than about 0.1 and more preferably greater than 1.0.

The contaminants decompose in the reaction into simple non-toxic fragments including water, carbon dioxide, and oxygen. Halogen ions from decomposed halogenated hydrocarbons will remain in remediated water, but will be present in non-hazardous concentrations, for example, less than would be found in fluorinated or chlorine-treated domestic water supplies.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

THE FIGURE is a flow chart schematically illustrating one preferred embodiment of the remediation method of the present invention for remediating contaminated soil.

DETAILED DESCRIPTION OF THE INVENTION

Referring now to THE FIGURE, flow diagram 10 illustrates a preferred embodiment of the method present invention for remediating soil contaminated at least one of pentachlorophenol (PCP) or polychlorinated biphenyls (PCBs). The contaminated soil (box 12), is mixed with a metal (box 14) and an aqueous solution (box 16) including an oxidant, to form a slurry (box 18). The metal may be a pure (elemental) metal or a metal alloy including one or more metallic elements.

The aqueous solution preferably has a pH less than 14.0. A preferred oxidant is $H_2O_2$. Other oxidants such as sodium hypochlorite may be used, however, $H_2O_2$ has the advantage that it does not produce toxic by-products and can be used in concentration up to 40% by weight. Preferred metals are iron, aluminum, manganese, and magnesium or alloys including one or more of these metals. The use of other metals, however, is not precluded. Mixtures of one or more different metals may also be used. Of these preferred metals iron is most preferred. Most of these preferred metals are non-toxic and can remain in soil after contaminants have been removed. It is preferable that the metal be added in powder form to provide the maximum possible surface area of metal for contacting other reactants in the slurry.

While the selection of relative quantities of soil aqueous solution, oxidant concentration, and metal in the slurry, will be determined by the extent of soil contamination, generally there should preferably be sufficient solution to form a relatively loose slurry which can be easily agitated. Metal is preferably added in a molar ratio with the oxidant of greater than 0.1, and more preferably greater than 1.0. In cases of extreme contamination a molar ratio of metal to oxidant of up to 10.0 may be requires. The slurry formation and reaction can take place in any suitable reaction vessel. The slurry preferably should be at least periodically agitated to enable to components of the slurry to mix and react. Continuous agitation is preferred over periodic agitation. The slurry is preferably maintained at a temperature above freezing but less than about 80° C. while it is being agitated.

Under the above described conditions, essentially all contaminants in the soil will decompose, in a relatively short time period, for example about one-hour, into non toxic fragments such as water, carbon dioxide, and oxygen. The term "essentially all contaminants" here, and throughout this description and the appended claims, means that any remaining concentrations of the contaminants will be below hazardous levels. Typically these levels are established by state or local regulations. Any halogens, such as chlorine and fluorine, resulting from breakdown of contaminants will be present in quantities substantially less than would be found in a fluorinated or chlorinated domestic water supply.

Continuing now with reference to THE FIGURE, after essentially all contaminants have been decomposed, soil is separated from the aqueous solution of the slurry (box) 20. This may be accomplished by any well-known method such as settling or filtration. The separated soil is then preferably rinsed (box 22) to remove traces of aqueous solution. The rinsed soil may then be returned to the site in which it was found or to a different site.

Effluent from the rinsing process may be added to aqueous solution which has been separated from the slurry (box 26). The mixture effluent and separated aqueous solution will typically have a higher pH value than the original aqueous solution of box 18, and oxidant concentration will have been depleted as a result of the contaminant decomposition reaction. At least a portion of this mixture may be brought to the oxidant concentration of the original aqueous solution, by adding oxidant. This pH adjusted solution used for forming another batch of slurry (box 30).

It should be noted, here, that those familiar with the art to which the present invention pertains will recognize from the description of the preferred embodiment of the present invention given above, and from a description of other embodiments presented below, certain types of apparatus which are suitable for carrying out these embodiments depending on a contemplated scale. Accordingly no specific apparatus descriptions are presented herein.

In the methods of the FIGURE, as indicated above, the original aqueous solution may have a pH value within a relatively wide range, including acidic and basic values as discussed above. In the case of a reaction including the most preferred metal, iron, it has been determined that the reaction will proceed more quickly, the lower the pH of the aqueous solution. Use of an acidic aqueous solution for the reaction is thus preferred. If water to be contaminated is not acidic, as found, it can be made so by addition of an acid, for example, sulfuric acid. By way of example, using hydrogen peroxide as the oxidant, and iron as the metal, it has been determined that decontamination will proceed at a rate about three to fifteen times faster, depending on the contaminant, in an (acidic) aqueous solution having a pH of about 3.0, than in a (basic) aqueous solution having a pH of about 10, all else being equal. Relative reaction rates for other metals and oxidants may vary but can be quickly determined experimentally.

It is emphasized here that it is important that metal is added in more than would normally be considered catalytic amounts. While the form of the decomposition reaction is not exactly known, it is clear that for practically acceptable levels of decomposition, for example greater than 98%, metal should be present in what may be described as reagent percentages. From a description of certain tests presented below, it will be evident to one skilled in the art to which the present invention pertains that an oxidant alone is not sufficient to cause destruction of PCP and PCB, nor is an oxidant in combination with a metal salt, i.e., with metal in ionic form. Further, as the tests show that metal is consumed in the reaction, it is clear that the metal does not act as a catalyst, but as a consumable reagent.

Table 1 presents results of tests on a slurry including 50 grams (g) of soil contaminated with 200 parts per million (ppm) of PCP in 200 milliliters (ml) in a solution including different reagents. The experiments of TABLE 1 were carried out in a glass reactor, at a slurry temperature of about 23° C., with the slurry agitated by a stirrer operating at 200 revolutions per minute (rpm).

TABLE 1

| Test No. | Reagents | Reaction Time | % PCP Destruction | pH | % Fe Consumed |
|---|---|---|---|---|---|
| 1 | 0.5 mol $H_2O_2$ | 1 Hr | <2 | 2.7 | N/A |
| 2 | 0.5 mol $H_2O_2$ 0.1 mol $FeCl_3$ | 1 Hr | <2 | 1.4 | N/A |
| 3 | 0.5 mol $H_2O_2$ 0.1 mol $FeCl_2$ | 1 Hr | <2 | 2.7 | N/A |
| 4 | 0.5 mol $H_2O_2$ 0.1 mol Fe | 1 Hr | >98 | 2.7 | >99 |
| 5 | 0.1 mol Fe | 1 Hr | <2 | 2.7 | 5 |

From TABLE 1 it can be seen that, in similar time periods, the oxidant ($H_2O_2$) alone, and the oxidant in combination with either $Fe^{2+}$ or $Fe^{3+}$ ions provided negligible PCP destruction, while the oxidant with the same amount of Fe in metallic form provide 98% destruction. It can also be seen that in test 4, a reaction in accordance with the present invention more than 99% of the Fe reagent is consumed.

TABLE 2 presents results of tests on an aqueous solution containing 20 ppm of PCP (dissolved in hexane) and different reagents. The experiments of TABLE 2 were carried out in a glass vial, at a solution temperature of about 23° C., with the solution agitated by wrist-shaker action.

TABLE 2

| Test No. | Reagents | Reaction Time | % PCP Destruction | pH | % Fe Consumed |
|---|---|---|---|---|---|
| 1 | 100 microliter 3% $H_2O_2$ | 15 Min | <2 | 3.0 | N/A |
| 2 | 2 mg Fe | 15 Min | <2 | 3.1 | 4 |
| 3 | 100 microliter 3% $H_2O_2$ 60 mg $FeSO_4$ | 15 Min | <2 | 3.0 | N/A |
| 4 | 100 microliter 3% $H_2O_2$ 70 mg $Fe_2(SO_4)_3$ | 15 Min | <2 | 3.0 | N/A |
| 5 | 100 microliter 3% $H_2O_2$ 20 mg Fe | 15 Min | >98 | 3.0 | 21 |
| 6 | 100 microliter 3% $H_2O_2$ 20 mg Fe | 15 Min | 89 | 4.1 | 18 |

From Table 2, it is evident that Fe alone, oxidant alone, or oxidant in combination with $Fe^{2+}$ or $Fe^{3+}$ are not effective in PCP destruction. It is also evident that a combination of oxidant and metallic Fe is more effective the lower the solution pH. It should be noted here that in tests 5 and 6, the Fe reagent is not completely consumed.

This is because the molar ratio of $H_2O_2$ to Fe is about 1:4.

TABLE 3

| Test No. | Reagents | Reaction Time | % PCB Destruction | pH | % Fe Consumed |
|---|---|---|---|---|---|
| 1 | 100 microliter 3% $H_2O_2$ 60 mg $FeSO_4$ | 10 Min | 7 | 5.3 | N/A |
| 2 | 100 microliter 3% $H_2O_2$ 20 mg Fe | 10 Min | 41 | 5.3 | 17 |

TABLE 3-continued

| Test No. | Reagents | Reaction Time | % PCB Destruction | pH | % Fe Consumed |
|---|---|---|---|---|---|
| 3 | 150 microliter 37% H$_2$O$_2$ 200 mg Fe | 10 Min | 71 | 1.5 | 40 |

TABLE 3 presents results of tests on an aqueous 2% NaCl solution containing 74 ppm of PCB (AROCLOR 1268 and AROCLOR 1260 dissolved in hexane) and different reagents. The experiments of TABLE 3 were carried out in a glass vial, at a solution temperature of about 23° C., with the solution agitated by wrist-shaker action. Note that in tests 2 and 3 Fe is added in a molar ratio of about 4:1 with H$_2$O$_2$. In test 3, significantly greater destruction of PCB is achieved than in test 2, presumably because of the lower pH and higher concemtrations of metallic iron.

In summary a method of remediating soil contaminated with contaminants including pentachlorophenol (PCP) and polychlorinated biphenyls (PCBs) is described above. The essential feature of the method includes reacting the contaminated soil with an oxidant, and reagent amounts of a metal, in elemental or alloy form, until essentially all of the contaminants have been decomposed and soil is essentially free of the contaminants. Other steps are described for separating decontaminated soil. The method does not require reaction temperatures greater than 80° C. and, accordingly, does not require the high energy consumption of prior art incineration methods.

While the method of the present invention has been described in terms of preferred embodiments, the method is not limited to those embodiments described and depicted. Rather, the invention is limited only by the claims appended hereto.

What is claimed is:

1. A method of removing contaminant material including phenol related compounds from soil contaminated therewith, the method comprising the steps of:
    (a) mixing the contaminated soil with reagents including, a metal in metallic form selected from the group of metals consisting of iron, aluminum, manganese and magnesium, and a first, acidic aqueous solution including an oxidant, thereby forming a first slurry, said metal being present in said aqueous solution in a molar ratio greater than about 0.1 with said oxidant;
    (b) periodically agitating the first slurry until essentially all of the contaminant material in the soil has been decomposed, thereby forming a second slurry, said second slurry including soil which is essentially free of the contaminant material, and a second aqueous solution; and
    (c) separating the essentially contaminant-material-free soil from the second aqueous solution.

2. The method of claim 1 wherein the phenol related compounds at least one of pentachlorophenol (PCP) or poly chlorinated biphenyls (PCBs).

3. The method of claim 1 wherein said metal is present in said aqueous solution in a molar ratio greater than about 1.0 and with said oxidant.

4. The method of claim 1 wherein said oxidant is hydrogen peroxide.

5. The method of claim 1 wherein said metal includes at least iron.

6. The method of claim 1 wherein said acidic solution is made acidic by addition of an acid thereto.

7. The method of claim 1 wherein said molar ratio of metal is selected in direct relationship to an anticipated level of the contaminant material in the contaminated soil.

* * * * *